(12) United States Patent
Yamasaki et al.

(10) Patent No.: US 9,716,974 B2
(45) Date of Patent: Jul. 25, 2017

(54) SYSTEMS AND METHODS OF GENERATING AND DISPLAYING LOCATION ENTITY INFORMATION ASSOCIATED WITH THE CURRENT GEOGRAPHIC LOCATION OF A MOBILE DEVICE

(71) Applicant: Google Inc., Mountain View, CA (US)

(72) Inventors: Erika Yamasaki, Tokyo (JP); Madoka Katayama, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/734,578

(22) Filed: Jun. 9, 2015

(65) Prior Publication Data

US 2016/0366545 A1    Dec. 15, 2016

(51) Int. Cl.
| | |
|---|---|
| *H04W 24/00* | (2009.01) |
| *H04W 4/02* | (2009.01) |
| *G06F 3/0484* | (2013.01) |
| *G06F 3/0482* | (2013.01) |
| *G01C 21/36* | (2006.01) |
| *H04W 4/04* | (2009.01) |

(52) U.S. Cl.
CPC .......... *H04W 4/02* (2013.01); *G01C 21/3682* (2013.01); *G06F 3/0482* (2013.01); *G06F 3/04842* (2013.01); *H04W 4/025* (2013.01); *H04W 4/04* (2013.01)

(58) Field of Classification Search
None
See application file for complete search history.

(56) References Cited

U.S. PATENT DOCUMENTS

| | | | |
|---|---|---|---|
| 7,310,534 B2 * | 12/2007 | Northcutt | .......... H04M 1/72572 342/357.31 |
| 8,200,247 B1 | 6/2012 | Starenky et al. | |
| 2004/0248586 A1 | 12/2004 | Patel et al. | |

(Continued)

OTHER PUBLICATIONS

"Foursquare 7.0 Brings Scannable Design and Expands Proactive Recommendations to all Users", TechCrunch, techcrunch.com/2013/12/05/foursquare-7-0-brings-scanable-design-and-expands-proactive-recommendations-to-all-users/, accessed Jan. 19, 2015, 8 pages.

(Continued)

*Primary Examiner* — Shantell L Heiber
(74) *Attorney, Agent, or Firm* — Dority & Manning, P.A.

(57) ABSTRACT

Computer-implemented methods and systems of displaying location entity information associated with the current geographic location of a mobile device include obtaining data indicative of a current geographic location of the mobile device and providing map imagery of a geographic area associated with such current location. A first interface element is provided for display on the map imagery at a location indicative of the current geographic location of the mobile device. A location entity is determined as a best match from a list of nearby location entities and a second interface element providing information about the determined location entity is provided for display on the map imagery. Data indicative of user selection of one or more of the first and second interface elements can be received. Upon selection, a separate display area including information about the determined location entity is automatically provided for display.

19 Claims, 9 Drawing Sheets

(56) References Cited

U.S. PATENT DOCUMENTS

2008/0070593 A1* 3/2008 Altman ................ H04L 63/102
 455/457
2011/0238762 A1 9/2011 Soni et al.
2011/0313657 A1 12/2011 Myllymaki et al.

OTHER PUBLICATIONS

"Google Map and Custom Marker for Current Location", StackOverflow, stackoverflow.com/questions/9625699/google-map-and-custom-marker-for-current-location, accessed Jan. 19, 2015, 2 pages.
PCT International Search Report for corresponding PCT Application No. PCT/US2016/036329, mailed on Sep. 12, 2016, 6 pages.
"Google Buzz for mobile", Youtube, Posted on Feb. 8, 2010, https://www.youtube.com/watch?v=k5leog9JCkc, 2 pages, Retrieved from the Internet on Aug. 29, 2016.
Ronnie Tan, "Find places near me", Youtube, Posted on Jan. 31, 2014, https://www.youtube.com/watch?v=BvjpyZalVlg, 1 page, Retrieved from the Internet on Aug. 30, 2016.
Thang Nguyen, "City Search: Places Near Me App for Android", Youtube, Posted on Jan. 11, 2015, https://www.youtube.com/watch?v=T4yuMBFRXMI, 2 pages, Retrieved from the Internet on Aug. 30, 2016.

* cited by examiner

SYSTEMS AND METHODS OF GENERATING AND DISPLAYING LOCATION ENTITY INFORMATION ASSOCIATED WITH THE CURRENT GEOGRAPHIC LOCATION OF A MOBILE DEVICE

FIELD

The present disclosure relates generally to providing location information for display in a mapping application, and more particularly to generating and displaying location entity information associated with the current geographic location of a mobile device.

BACKGROUND

Mobile mapping applications are available to provide certain portions of current location information to a mobile device user. For example, some mobile mapping users are able to see geographic coordinates (e.g., latitude and longitude) of their current location on a map. However, the geographic location does not automatically correlate with the semantic name of a location entity (e.g., the name of a place of business). Without having access to the name or place associated with a user's current geographic location, the user cannot immediately access additional electronically available information about that place. For example, a mobile device would need to know the name of the location entity in order to retrieve data pages displaying additional information about those location entities. In known systems, the user would have to separately type out the name of the location entity in a separate browser or search window to access additional information.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of displaying location entity information associated with the current geographic location of a mobile device. The method can include obtaining data, by one or more computing devices, indicative of a current geographic location of the mobile device. The method can also include providing for display, by the one or more computing devices, map imagery of a geographic area associated with the current geographic location of the mobile device. The method can further include providing for display, by the one or more computing devices, a first interface element on the map imagery at a location indicative of the current geographic location of the mobile device. The method can still further include determining, by the one or more computing devices, a location entity as a best match from a list of nearby location entities based at least in part on a factor analysis of the current geographic location of the mobile device relative to each location entity in the list of nearby location entities. The method can also include providing for display, by the one of more computing devices, a second interface element on the map imagery, wherein the second interface element provides information about the determined location entity. The method can further include receiving, by the one or more computing devices, data indicative of user selection of one or more of the first and second interface elements. The methods can still further include automatically providing for display, by the one or more computing devices, a separate display area including information about the determined location entity.

Other example aspects of the present disclosure are directed to systems, apparatus, tangible, non-transitory computer-readable media, user interfaces, memory devices, and electronic devices for generating and displaying location entity information associated with the current geographic location of a mobile device.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
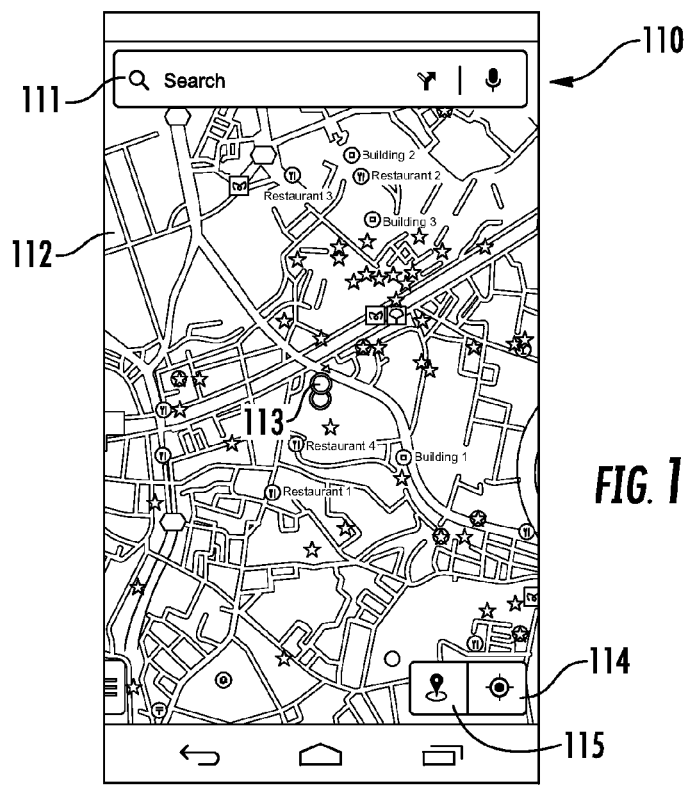
FIG. 1 depicts a first example graphical user interface configured to display location entity information associated with the current geographic location of a mobile device according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for generating and displaying location entity information associated with the current geographic location of a mobile device. In known mobile mapping applications, users are able to see geographic coordinates (e.g., latitude and longitude) of their current location on a map. However, the geographic location does not automatically correlate with the semantic name of a location entity (e.g., the name of a place of business). Without having access to the name or place associated with a user's current geographic location, the user cannot immediately access additional electronically available information about that place. For example, a mobile device would need to know the name of the location entity in order to retrieve data pages displaying additional information about those location entities. In known systems, the user would have to separately type out the name of the location entity in a separate browser or search window to access additional information.

The disclosed embodiments according to aspects of the present disclosure can generate and display location entity information associated with a current geographic location of a mobile device within a user interface, such as a mapping application interface for a mobile device. Location entity information can be in the form of various selectable graphical user interface (GUI) elements including icons and text labels that provide identification information for a determined location entity. Providing the location entity information in the form of one or more selectable GUI elements offers the advantage of linking additional information about a location entity to the mobile device upon selection of the GUI element(s). Users are also advantageously afforded an opportunity to correct determined location entities if they are incorrect, remove data points from their location history, or easily access additional tools and information that are relevant to enhance their experience while they are presently at a given location.

The disclosed embodiments include aspects of data analysis relative to mobile device location. It should be appreciated that mobile device location is only determined in the disclosed embodiments with corresponding user consent. Any authorized sharing of user location data is secure and private, and shared only if additional consent is provided. For many purposes, user identity associated with the location of a mobile device is configured in an anonymous manner such that user assistance and information related to a specific location is provided without a need for user-specific information.

Example embodiments can include computer-implemented systems and methods of generating and displaying location entity information associated with the current geographic location of a mobile device for display on a mobile device. Location entity information can include interface elements provided as part of a mapping application interface that generally shows map imagery of a geographic area associated with the current geographic location of a mobile device. A first interface element can correspond to an icon or other element positioned over the map imagery and provided at the estimated current geographic location of the mobile device. This first interface element can be configured to track with the user and his mobile device as the mobile device changes locations.

Before providing additional interface elements for display, a mobile device determines whether its current geographic location can be correlated with one or more nearby location entities. In some embodiments, a comparison between the current geographic location of the mobile device and a list of nearby location entities results in determination of one of the nearby location entities as a best match. In some examples, location entity determination can be done automatically by a closest location determination. In other examples, location entity determination can additionally or alternatively consider personalization information indicating location entities of interest for a given user, such as previously visited locations, previously searched locations, previously saved locations and particular user preferences. In some examples of location entity determination, confidence scores are generated indicating the likelihood that a mobile device is currently located at each of the nearby locations. The confidence scores can be used in part to decide whether to automatically make a selection. If a selection cannot be made with high enough confidence, a list of nearby location entities can be displayed for a user to manually select the appropriate location entity corresponding with his current geographic location.

Once a location entity is determined corresponding to the current geographic location of the mobile device, additional interface elements can be provided for display on the mobile mapping interface or other mobile device interface. The additional interface elements provide information about the determined location entity. In some examples, an additional interface element includes a text label that provides a semantic identifier of the determined location entity and/or a user-assigned alias name associated with the determined location entity. The text label can be positioned adjacent to the interface element indicating the current geographic location of the mobile device. Such a text label can additionally or alternatively be provided in other locations, such as adjacent to a guide icon. In other examples, an additional interface element includes a graphical icon associated with a category of the determined location entity (e.g., a restaurant icon, home icon, work icon, etc.) that is superimposed or provided adjacent to the interface element indicating the current geographic location of the mobile device. These additional interface elements can be modified when the mobile device moves away from a determined location entity or selects a new location entity.

The one or more displayed interface elements that provide information about a determined location entity can be configured as selectable display elements that are linked to still further information about a location entity. For example, user selection of one or more of the interface elements can result in automatic initiation of a separate display area including information about the determined location entity. For example, the separate display area can correspond to a place page that includes contact information, website links, ratings and reviews and other information associated with the location entity. The separate display area can also include an interface element or other indication that the particular location entity has been determined as a best match to the current geographic location of the mobile device.

Additional display features or notifications can be used to provide a user with information about a determined location entity corresponding to the current geographic location of a mobile device. For instance, upon selection of a corresponding location entity, an interface element displayed on map imagery of a geographic area can be shifted from the estimated current location of the mobile device to known coordinates for the determined location entity. Notifications can be selectively sent to the mobile device indicating that one of the nearby location entities has been determined as a best match to the current geographic location of the mobile device.

According to an example embodiment, a mobile device user is able to view information about his current geographic location on a map imagery interface provided on the mobile device. The interface includes a graphical user interface (GUI) element depicting the estimated current geographic location of the mobile device. The coordinates associated with the current geographic location are compared against a list of nearby locations, which optionally can be scored according to personalization information indicating location entities of interest for the given user. If a corresponding location entity can be determined with greater than a threshold confidence score, additional GUI elements can be provided on the map interface to provide additional information about the determined location entity, and selection of a GUI element results in display of a separate display area including a place page with additional information about the determined location entity. If a corresponding location entity can be determined only with a confidence score below a threshold level, then a list of nearby location entities can be displayed to a user for manual selection. The additional GUI elements can include icons (e.g., graphical indicators of a category of the determined location entity) and/or text labels (e.g., a semantic identifier for the location entity or a user-defined alias name). User selection of the displayed GUI elements can result in additional place page information about the determined location entity being provided for display on the mobile device, thus providing immediate access to additional information such as contact information, website links, ratings and reviews and other information associated with the location entity.

In some embodiments, in order to obtain the benefits of the techniques described herein, the user may be required to allow the collection and analysis of information collected by modular devices. For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable or other information is removed.

Referring now to FIGS. 1-16, various specific aspects of example systems and methods for generating and displaying location entity information associated with the current geographic location of a mobile device are depicted. FIGS. 1-16 generally depict example display elements within graphical user interfaces used in accordance with the disclosed embodiments. With more particular reference to FIG. 1, an example graphical user interface 110 can be provided as part of a mapping application, geographic information system, navigation application or other application that can be used to determine and/or access current location, navigation directions or other geographical information. Interface 110 can include a searching interface element 111 by which a mobile device user can enter the name of a particular location or destination for the mapping application to identify. Interface 110 can also include a larger interface portion 112 corresponding to map imagery of a geographic area associated with the current location of a mobile device. Map imagery 112 can include basic map components such as towns, roads, landmarks, area designators, bodies of water, public transportation routes and stops, etc.

Referring still to FIG. 1, interface element 113 is provided on the map imagery 112 at a location indicative of the current geographic location of the mobile device. Interface element 113 is shown in FIG. 1 as a generally circular icon with a small arrow extension, although it should be appreciated that any type of icon can be used to generally indicate the current geographic location of the mobile device on the map imagery 112. The current geographic location can be calculated using one or more known location determination techniques, including but not limited to determining real time location signals from location sensors provided within a mobile device. Location sensors can include, but are not limited to, global positioning system (GPS) outputs, wireless scan outputs, and accelerometer outputs, or other components that can be employed to obtain a best known estimate of a user's physical location (e.g., specific geographical coordinates.)

The bottom right portion of interface 110 also includes additional interface elements 114 and 115 that can be configured as selectable icons for initiating specific action relative to the mapping interface 110. For example, interface element 114 can correspond to a "My Location" icon that shifts the map imagery 112 and current location interface element 113 such that the current location and surrounding map imagery is generally centered within user interface 110. Interface element 115 can correspond to a "Guide" or "Explore" icon that upon selection provides additional information about the current location or area surrounding the current location of the mobile device. In some examples, a change in appearance to interface elements 114 and/or 115 can be implemented to indicate that the mapping application is presently tracking the current geographic location of a user. For example, a user can tap on the "My Location" icon 114 at which point the icon 114 can change colors or other appearance aspect to indicate that the mobile device is now in a tracking mode. Upon receipt of data indicating user selection of "My Location" icon 114, the "Guide" icon 115 can also turn color or otherwise change an aspect of appearance to indicate that the content available via the guide application represents places that are around the user's current geographic location.

The user interface of FIG. 1 provides basic geographic coordinates for the current geographic location of a mobile device. However, additional details about a user's current location are often desirable. Of particular interest relative to the disclosed embodiments is the determination of a particular location entity associated with the current geographic location of a mobile device. A particular location entity generally corresponds to a semantic identifier for a feature, landmark, point of interest (POI), or other object or event associated with a geographic location. For instance, a location entity can include a business, restaurant, residence, retail outlet, coffee shop, bar, music venue, attraction, museum, theme park, arena, stadium, place of worship, festival, organization, region, neighborhood, a subset of another location entity or another suitable point of interest. Identification of a particular location entity can include the identification of a semantic place name, which is a regionally unique identifier of the location entity, which is distinguishable from a coordinate-based or location-based identifier. However, in addition to a name, the semantic place data associated with a particular location entity by the disclosed embodiments can further include metadata about the location entity, such as its category; partial, uncertain, and/or complete information about the venue's physical location and geometry; and one or more characterizations of distributions of behaviors, demographics, or psychographics of users who visit this location entity. Location entities can also be defined in terms of an alias identifier assigned to a particular location entity by a user. For example, a user could define a particular high-rise condo corresponding with the user's primary residence to have an alias of "home," while the office building housing the user's employer could be defined as "work."

Determination of a location entity as matching that of the current geographic location of a mobile device can involve identifying a best match from a list of nearby location entities. Sources for identifying a list of nearby location entities as candidates can include, for example, a database of entity information that links location entities to geographic locations (e.g. a geographic information system database). In some examples, a predetermined number of candidate location entities (e.g., top five or top ten candidate location entities) are identified. This subset of candidate location entities can then be analyzed to determine a best match by the determination algorithms disclosed herein, and/or can also be used in a disambiguation display by which a user can manually select a best match associated with his current geographic location. Having a subset of candidate location entities can help facilitate efficiency in the disclosed determination algorithms without requiring comprehensive factor analysis for all nearby location entities.

Factors for determining a best match among possible candidate location entities can include one or more of: a location signal availability factor indicating the level of location sensor information available in determining a user's precise geographic location (e.g., GPS signals, wi-fi scans, cellular triangulation signals, etc.); a distance factor representing a distance between each candidate location entity and the current geographic location; a popularity factor describing a popularity of each location entity (e.g., a number of social media mentions, a number of check-ins, a number of requests for directions, and/or a global popularity rank); a business hour overlap factor describing whether a set of business hours associated with the location entity overlap with a time segment during which the current geographic location was identified; and one or more personalization factors describing previous interaction between the user and the candidate location entities. Example personalization factors can include: a number of instances in which the user performed a map click with respect to the location entity; a number of instances in which the user requested directions to the location entity; a number of instances in which the user has checked-in to the location entity; a number of instances in which the user has transacted with the location entity as evidenced by data obtained from a mobile payment system or virtual wallet; and/or a number of instances in which the user has performed a web search query with respect to the location entity.

Determination of a location entity as a best match for the current geographic location of a mobile device can also include determination of whether the best match is made with a high confidence score or a low confidence score. In such examples, confidence scores can be generated for each candidate location entity based on one or more of the above factors for determining a best match. Confidence scores higher than a predetermined value can be considered high confidence scores, while confidence scores lower than a predetermined value can be considered low confidence scores. The predetermined threshold value for determining high and low confidence can be chosen such that high confidence determinations indicate having strong signals pinpointing the specific location of a mobile device, while low confidence determinations are not able to pinpoint exact location with strong precision. Ranges of confidence scores can also be used in accordance with the disclosed determination techniques. Use of confidence scores and ultimate determination of identified location entities as having high confidence and/or low confidence can provide different features for display in a graphical user interface.

Figure 2:
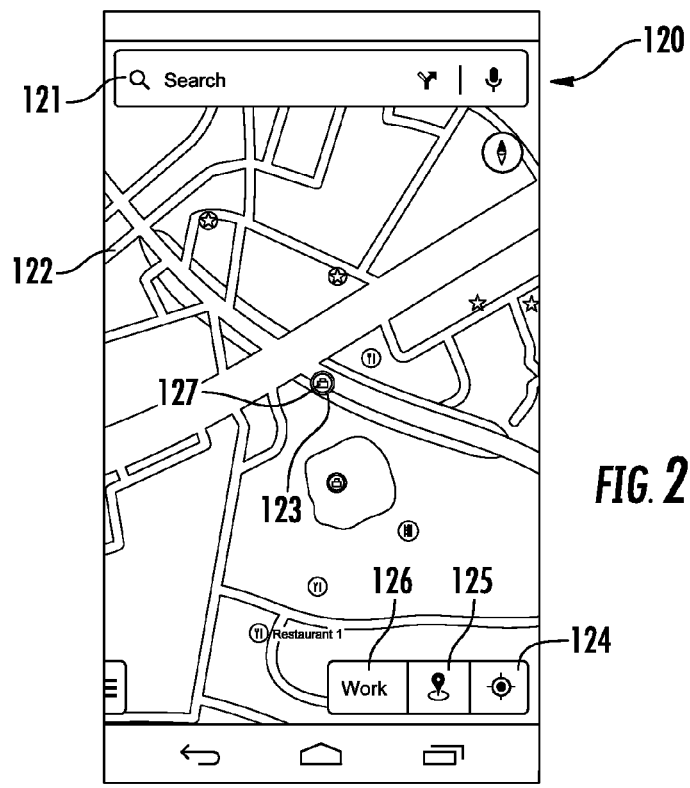
FIG. 2 depicts a second example graphical user interface configured to display location entity information associated with the current geographic location of a mobile device according to example aspects of the present disclosure.
Figure 3:
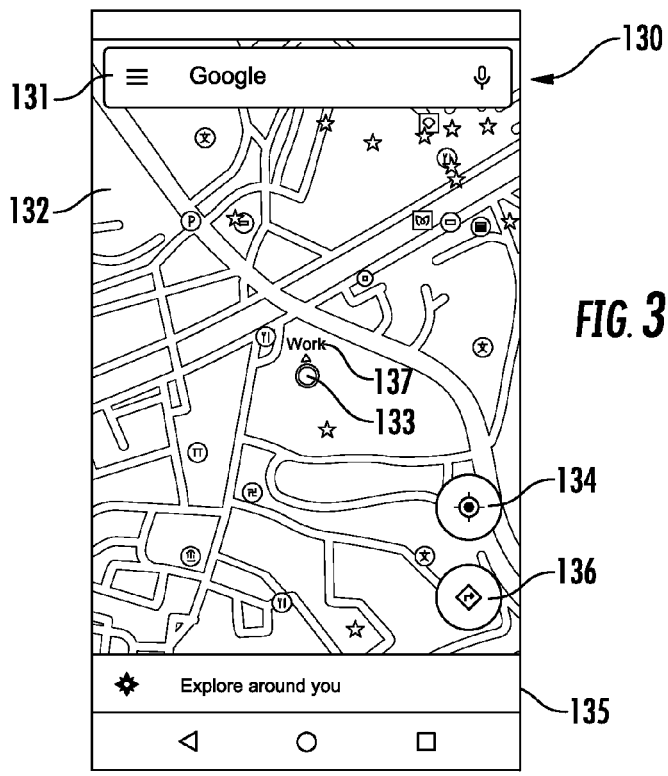
FIG. 3 depicts a third example graphical user interface configured to display location entity information associated with the current geographic location of a mobile device according to example aspects of the present disclosure.

FIGS. 2-3 show various interface elements provided for display when a location entity is determined in accordance with the disclosed techniques having a high confidence of likelihood that its determination is correct. For example, FIG. 2 shows a user interface 120 similar to interface 120 of FIG. 1, and including a searching interface element 121, general map imagery 122 associated with a current geographic location, interface element 123 depicting the current geographic location of the mobile device, a "My Location" icon 124 and a "Guide icon" 125. In the example of FIG. 2, a determination is made that the current geographic location represented by interface element 123 is best matched to "Google Japan" as the corresponding location entity. Google Japan also may have been previously identified by the user as corresponding to that user's work location. As such, the user has defined "work" as an alias location entity name for Google Japan.

Two particular updates are included in user interface 120 of FIG. 2 depicting the identification of a particular location entity as best match for the current geographic location. A first update is represented in the form of an additional interface element 126. Additional interface element 126 corresponds to a text label positioned adjacent to "Guide" icon 125. In the example of FIG. 2, text label 126 provides a user-assigned alias name associated with the determined location entity, e.g., "Work." In other examples, text label 126 could include non-alias semantic place names for a location entity (e.g., "Google Japan") or a street address or other descriptive geographic identifier (e.g., "32 Elm Street.")

A second update is provided by way of additional interface element 127, corresponding to a graphical icon associated with a category of the determined location entity. Graphical icon 127 can be superimposed over or provided adjacent to interface element 123 in order to provide an indication to the user that a corresponding location entity has been determined and also to provide additional information about the determined location entity. Different categories of location entities that have a dedicated type of icon for use as interface element 127 include but are not limited to home, work, airport, ATM, bank, bar, café, camping, cemetery, civic building, golf course, harbor, hospital, library, lodging, monument, movie theater, museum, park, parking lot, police, post office, restaurant, school, shopping, supermarket, temple, university, and place of worship. Icons can be customized for different countries to maximize informational context for different users. In addition, some categories of location entities can be broken down into more particular subsets of particular types of a location entity. For instance, places of worship could have different icons based on type, e.g., Buddhist, Christian, Hindu, Islam, Jain, Jewish, Mormon, Sikh, etc. In the example of FIG. 2, the briefcase icon used for interface element 127 tells a user that the determined location entity corresponds to a work location. In some examples of the disclosed technology, the updates to user interface 120 of FIG. 2 are only made when the location entity determination is made with high confidence as opposed to low confidence.

FIG. 3 depicts a different example of an additional interface element that can be provided for display to depict a high confidence determination of a particular location entity as best matching the current geographic location of a mobile device. In FIG. 3, user interface 130 includes a searching interface element 131, map imagery 132, interface element 133 positioned at a location indicative of the current geographic location of the mobile device, a "My Location" icon 134, a "Guide" tab 135, a "Get Directions" icon 136, and an additional interface element 137 for identifying a determined location entity. Interface element 137 corresponds to a text label positioned adjacent to interface element 133, wherein the text label provides a semantic identifier of the name of the determined location entity. In the example of FIG. 3, the semantic identifier for the determined location entity corresponds to the user-defined alias "Work." In other examples, text label 137 could include non-alias semantic place names for a location entity, e.g., "Google Japan." In other examples, text label 137 can also include a determined address (e.g., "32 Elm Street"). In some instances, the disclosed embodiments can be configured to display information in text label 137 based on a hierarchical approach of available information about a location entity determined to match the current geographic location of a mobile device. An example text label hierarchy can first display an alias name if available. If an alias name is not available, the text label can alternatively display a semantic place name for the location entity if available. If the semantic place name is not available, then the text label can alternatively display a street address or other descriptive geographic identifier.

Figure 4:
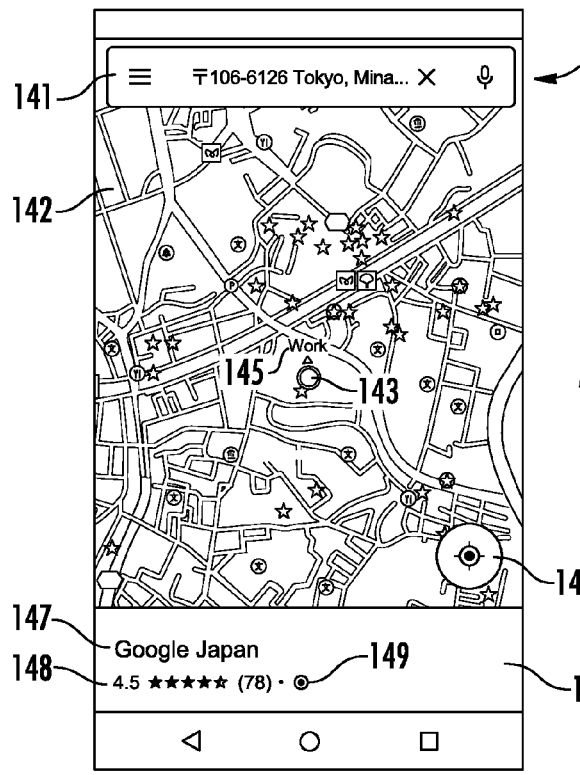
FIG. 4 depicts a fourth example graphical user interface configured to display location entity information associated with the current geographic location of a mobile device according to example aspects of the present disclosure.

Various interface elements provided in the disclosed embodiments are designed with an interactive nature such that the interface elements are selectable by a user in order to initiate the display of still further information about a current geographic location or corresponding location entity. For example, user selection (via touch screen or other input mechanism) of interface element 133 and/or interface element 137 in FIG. 3 can result in the display of a user interface 140 as shown in FIG. 4. User interface 140 includes a text interface portion 141 that is automatically populated with the street address corresponding to the determined location entity for Google Japan, aka "Work." User interface 140 also includes map imagery 142, current location interface element 143, "My Location" icon 144, and location entity text label 145. Previous interface elements 135 and 136 are replaced with a collapsed place page 146 that provides a subset of information about the determined location entity. More particularly, collapsed place page 146 includes a text label 147 identifying the current location entity as Google Japan, a rating identifier 148 (corresponding to a selectable hyperlink to more detailed reviews about the location entity), and an interface element 149 corresponding to a separate icon indicating that this particular location entity (i.e., Google Japan) is currently determined as matching the current geographic location of the mobile device. It should be appreciated that some user interfaces, including user interface 140 and others disclosed herein, might not include a rating identifier 148 in certain instances such as when the location entity is a residence or other type of location entity than a place of business and/or when a place of business doesn't yet have a sufficient number of reviews to calculate a rating.

Figure 5:
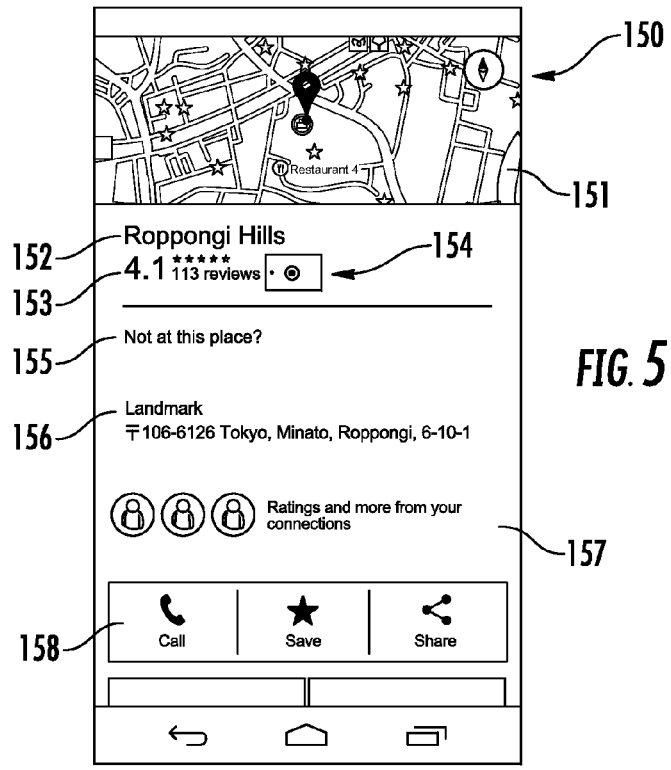
FIG. 5 depicts a fifth example graphical user interface configured to display location entity information associated with the current geographic location of a mobile device according to example aspects of the present disclosure.

User selection of one or more interface elements in a mapping interface in the disclosed embodiments can automatically initiate the display of a separate display area including information about the determined location entity. For example, a single-tap selection of interface elements 123, 125, 126 or 127 in FIG. 2, a double-tap selection of interface elements 133 and/or 137 in FIG. 3, or a single-tap selection of interface elements 143 and/or 145 in FIG. 4 can result in automatically initiated display of a separate display area including information about the determined location entity. FIG. 5 depicts an example interface 150 that corresponds to a place page that includes additional information about a determined location entity. Given that a determination is made of a mobile device being located at a current geographic location corresponding to the Roppongi Hills building complex, a place page 150 could include a variety of additional information about Roppongi Hills. For instance, an interface portion 151 includes a focused map depicting the immediate area around the determined location entity (Roppongi Hills), an interface portion 152 providing a semantic name label for the determined location entity, a ratings/review interface portion providing a text label indicating a rating score (e.g., 4.1/5 stars) and a hyperlink to more particular reviews about the determined location entity, an interface element 154 corresponding to an icon indicating that the particular location entity has been determined as a best match to the current geographic location of the mobile device, an interface element 155 providing a link to a disambiguation screen by which a user can manually select a different location entity if the location entity displayed on the place page 150 is different than the user's actual current geographic location, an interface element 156 providing detailed address information about the determined location entity, an interface element 157 providing a link to more detailed information from one or more personal contacts of the user relative to the determined location entity (e.g., picture and/or name identification of contacts within one or more of a user's social network accounts that have provided ratings of the determined location entity and hyperlinks to those ratings), and an additional interface element 158 providing quick links to action items relative to the determined location entity (e.g., an interface link to automatically call a phone number associated with the determined location entity, an interface link to save the determined location entity to a list of favorite locations, and an interface link to share information associated with the determined location entity with another user via email, text message, or other electronic communication. Additional information not depicted in the place page 150 of FIG. 5 can include additional details about the determined location entity (e.g., a hyperlink to an official website for the determined location entity) or an identification of user contacts that are at or near the determined location entity.

User selection of one or more interface elements in a mapping interface in the disclosed embodiments can additionally or alternatively initiate the automatic display of a disambiguation screen that allows a user to manually select among a plurality of nearby location entities as corresponding to the user's current geographic location. The availability of such disambiguation features can be especially helpful in instances where multiple location entities are close to one another in a given geographic space, where a single building houses multiple distinct location entities and/or in a situation where the accuracy of a mobile device's location sensors is limited or jeopardized. For example, selection of an interface element such as interface element 113 in FIG. 1 and/or one of interface elements 123, 125, 126 and/or 127 in FIG. 2 can result in the display of a disambiguation display depicted in the example user interface 160 of FIG. 6.

Disambiguation display 160 includes a first interface portion 161 including one or more identifiers of a determined best match associated with the mobile device's current geographic location. For example, having a designated icon 162 next to a particular location entity indicates to a user that this location entity is identified as the default best match for the mobile device's current geographic location. Additional items included in interface portion 161 include an actual name or an alias name 163 (e.g., Work) associated with the determined best match and an identified address 164 or other location information associated with the determined location entity.

Disambiguation display 160 also includes a second interface portion 165 that includes a list of nearby location entities, each item in the list corresponding to a respectively selectable interface element, by which a user can manually select the location entity corresponding to his current geographic location. The order in which the nearby location entities are displayed in the list within second interface portion 165 can vary depending on customizable factors, including but not limited to proximity or other location information and/or personalization information specific to a user. In one example, the list of nearby location entities can be ranked in descending order from closest location to farthest location within a predetermined area surrounding the current geographic location of the mobile device. In another example, the list of nearby location entities displayed to a user is ranked using a combination of location information indicating the distance from each nearby location entity to the current geographic location of the mobile device and personalization information indicating location entities of interest for a given user. Personalization information can include data associated with one or more of previously visited locations, previously searched locations, previously saved locations and user preferences. In some examples, personalization information can be available when a user is signed into his mapping application with user-specified login credentials, including but not limited to a user name and password associated with a personalized mapping application or other related applications having location-based information.

Figure 6:
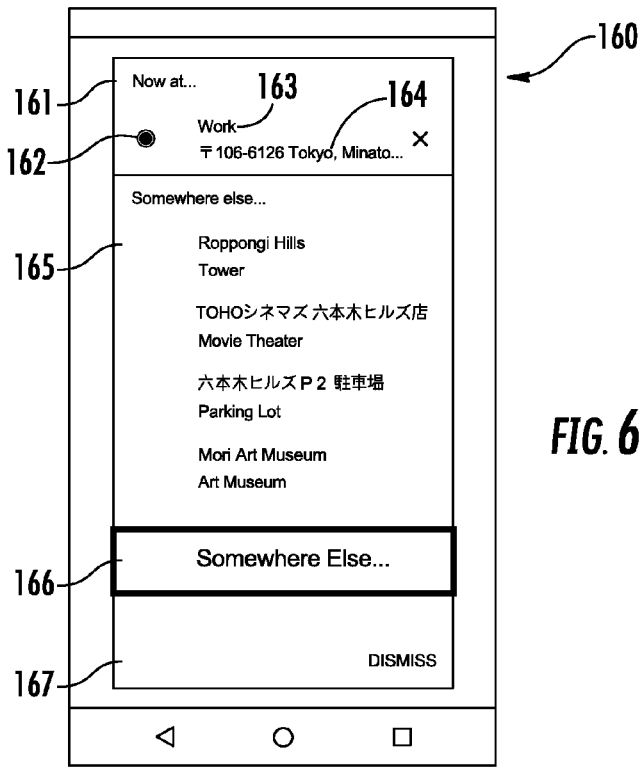
FIG. 6 depicts a sixth example graphical user interface configured to display location entity information associated with the current geographic location of a mobile device according to example aspects of the present disclosure.
Figure 7:
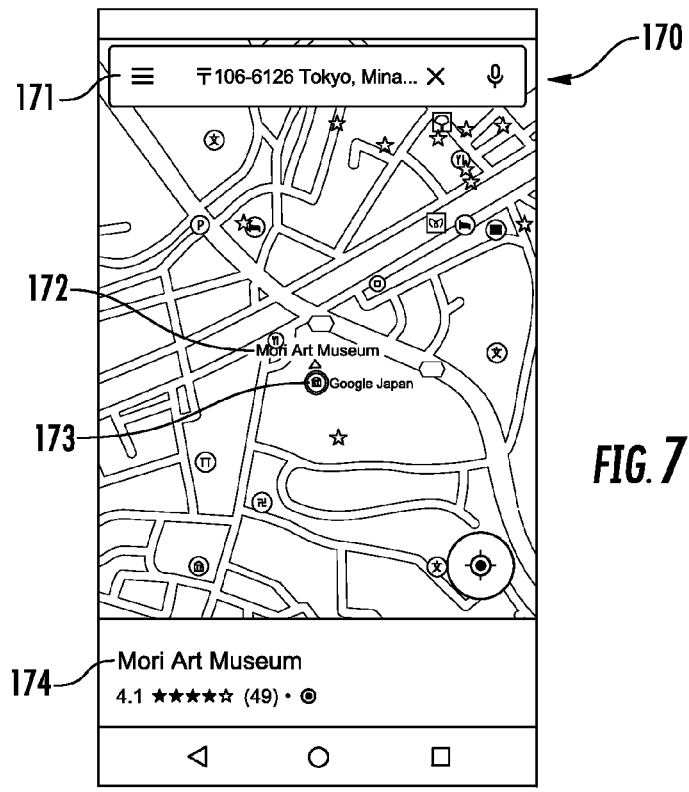
FIG. 7 depicts a seventh example graphical user interface configured to display location entity information associated with the current geographic location of a mobile device according to example aspects of the present disclosure.

Referring still to FIG. 6, the list of nearby location entities 161 can also include additional interface elements to facilitate user identification of a corresponding current location entity when the current location entity is not shown in the automatically generated list of nearby location entities. For instance, "Somewhere Else" interface element 166 corresponds to a separate interface item selectable by a user that initiates display of an interface for searching for a nearby location entity that is not on the list of nearby location entities. In some examples, a "Search" interface element can be geo-restricted to places that are nearby only. This restriction can be based on an area defined relative to the size of an accuracy circle (e.g., an area defined around the estimated current geographic location within which location signals might be obtained with more accurate or precise results) and/or the size of a viewport (e.g., only location entities that are currently within the display window of a mobile device). In some examples, searching restrictions can be defined as a multiple of the accuracy circle size or the viewport size (e.g., two times the size of the accuracy circle or the viewport). Via interface element 166, a user can manually enter the name of a location entity that is not on the list of nearby location entities. "Dismiss" interface element 167 provides a selectable feature for closing the disambiguation display screen 160 and returning to the previous mapping interface.

Once a particular location entity is manually selected, searched for or entered by a user from disambiguation display 160, a mobile device can be configured to automatically display a separate display area including information about the selected location entity (e.g., displaying a place page such as that shown in FIG. 5.) The manual selection of a location entity can also result in updates to the mapping display as long as a user remains at this current location. For example, if a user manually selects "Mori Art Museum" as the location entity corresponding to his current geographic location in the list of FIG. 6, a user interface 170 corresponding to a current mapping interface can be updated to display the address corresponding to the selected location entity in searching interface element 171. A text label 172 with the name of the selected location entity (e.g., Mori Art Museum) also can be provided adjacent to the graphical icon associated with the device's current geographic location. A categorical icon 173 generally associated with museums can be included within the graphical icon associated with the device's current geographic location. In addition, a collapsed place page interface portion 174 includes links to additional information about the selected location entity.

Figure 8:
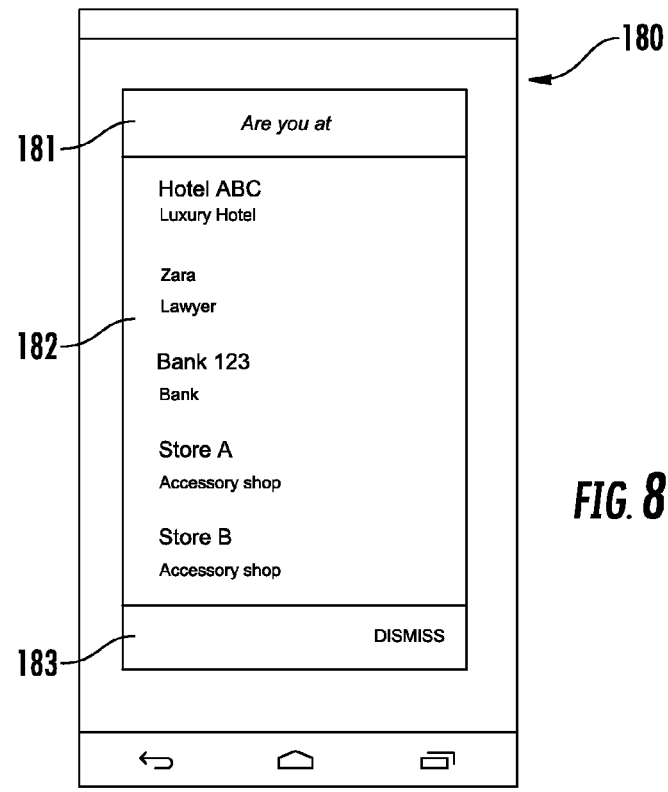
FIG. 8 depicts an eighth example graphical user interface configured to display location entity information associated with the current geographic location of a mobile device according to example aspects of the present disclosure.

Referring now to FIG. 8, another example of a disambiguation display 180 is depicted. Disambiguation display 180 provides an interface having a header portion 181, a list portion 182 and an exit interface element 183 for closing the disambiguation display. The list portion 182 of disambiguation display 180 does not include separate portions for a best guess and other options (as illustrated in FIG. 6), but instead includes a single, integrated list of nearby location entities. In some examples, the first one or more entries within the list portion 181 can correspond to the one or more best matches as automatically determined by the configured determination parameters including proximity, personalization features or the like.

Figure 9:
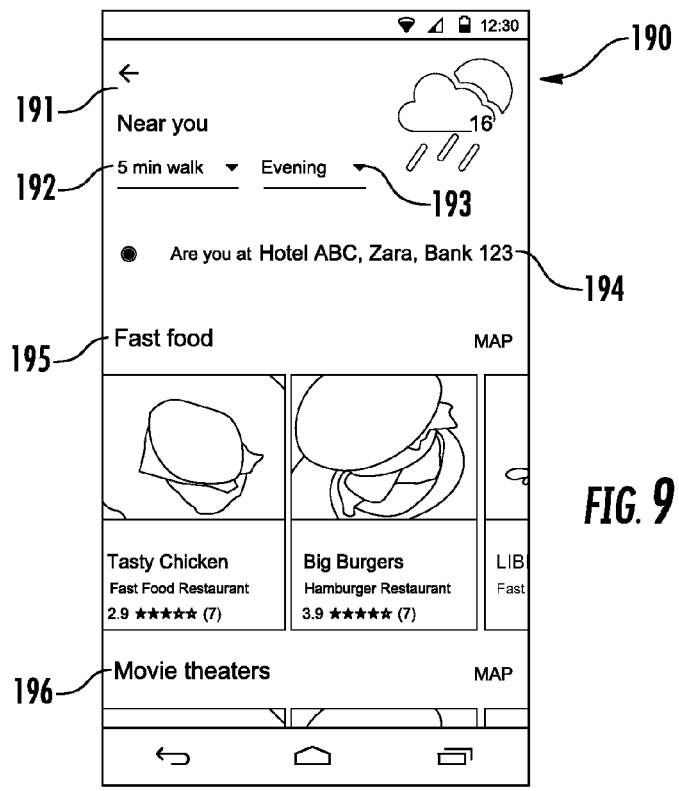
FIG. 9 depicts a ninth example graphical user interface configured to display location entity information associated with the current geographic location of a mobile device according to example aspects of the present disclosure.
Figure 10:
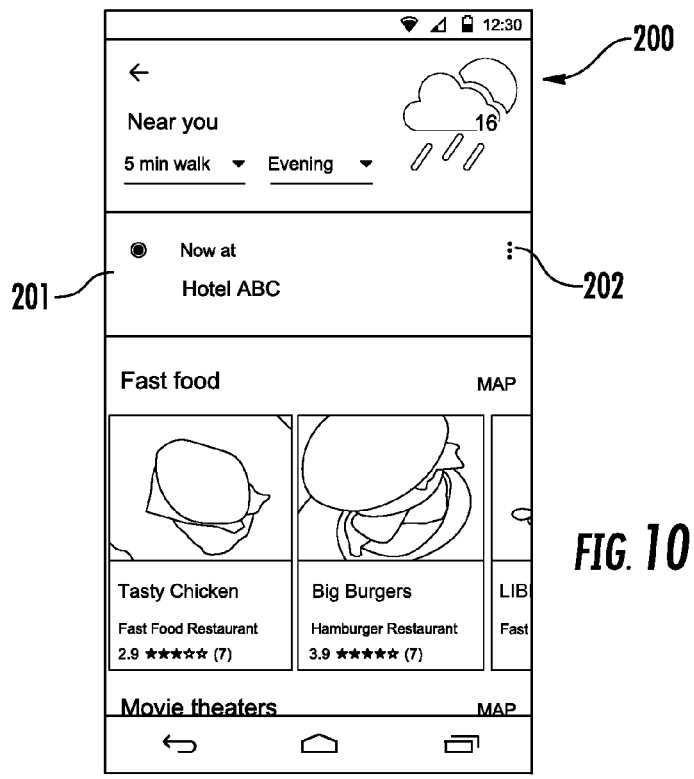
FIG. 10 depicts a tenth example graphical user interface configured to display location entity information associated with the current geographic location of a mobile device according to example aspects of the present disclosure.
Figure 11:
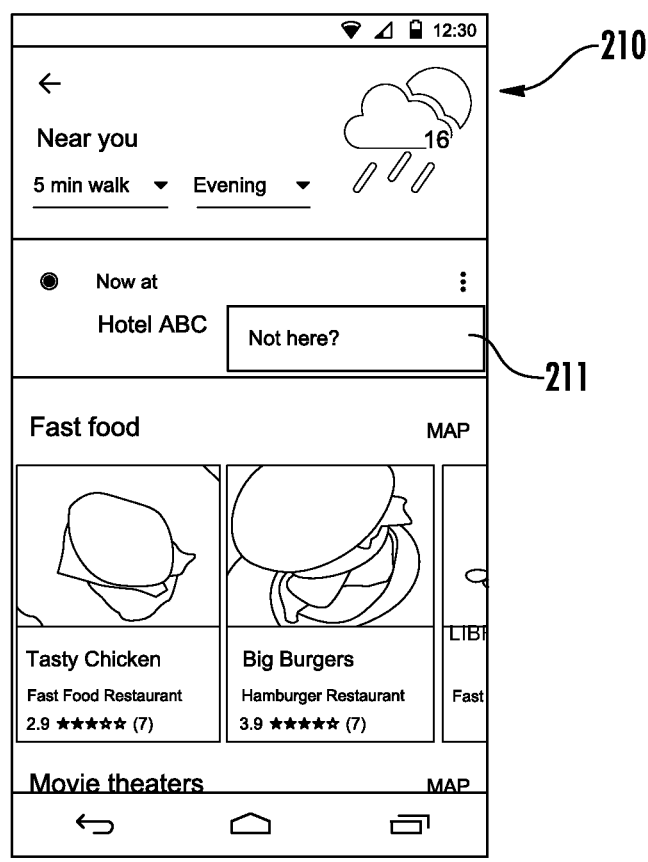
FIG. 11 depicts an eleventh example graphical user interface configured to display location entity information associated with the current geographic location of a mobile device according to example aspects of the present disclosure.

Referring now to FIGS. 9-11, examples of a "Guide" user interface are presented, such as might be displayed upon user selection of one or more interface elements in a mapping interface in the disclosed embodiments. For example, guide user interfaces could be presented upon user selection of a Guide icon such as interface element 115 in FIG. 1 or 125 in FIG. 2. Additionally or alternatively, a mapping system can be defined to initiate display of a guide interface upon user selection of other interface elements within the mapping application such as those previously described as relating to the current geographic location of a mobile device. In some examples, different guide interfaces can be displayed depending on the corresponding confidence score associated with a determined location entity. For instance, some guide interfaces can be utilized for location entities determined with a high confidence score (e.g., a confidence score having a value above a predetermined threshold value), while other guide interfaces can be employed for location entities determined with a low confidence score (e.g., a confidence score having a value below a predetermined threshold value).

FIG. 9 depicts an example guide interface 190 that can be displayed when a location entity is automatically determined for a user's current geographic location, but the determined location entity is only determined with low confidence. Guide interface 190 includes a header portion 191 providing an itemized framework for determining locations of interest near the user. Interface element 192 can be selected by a user to initiate display of a drop-down menu by which a user can select a desired limitation for defining an area around the user's current location. For instance, the user can select his guide interface to provide information about nearby location entities that are within a 5-minute walk, a 15-minute walk, a 5-minute drive, a 30-minute drive or other combinations of times, distances, travel types and the like. Interface element 193 can be selected by a user to initiate display of a drop-down menu by which a user can select the time of day that he is looking for open businesses (e.g., evening, morning, weekdays, weekends, or other specific options relating to the day or time of search).

Interface portion 194 can include an indication that Hotel ABC is determined to be the best match for a nearby location entity associated with the mobile device's current geographic location. Use of the indicator "Are you at" can be used to indicate that Hotel ABC was only determined with low confidence. In contrast, use of an indicator such as "You are at" or "Now at" such as displayed in interface portion 201 of example interface 200 of FIG. 10 can indicate to a user that Hotel ABC is determined to be a location entity best match with high confidence. Even when a location entity is determined with high confidence, a user interface such as interface 200 of FIG. 10 can include a selectable interface element 202 that initiates display of an additional selectable interface element 211 as shown in FIG. 11 that a user can toggle if the user is "not here" at the determined location entity. Using different guide interface formats when different confidence levels are determined for associated location entities provides appropriate information to a user while still affording convenient features for location entity correction when needed.

Referring again to FIG. 9, guide interface 190 can include one or more interface portions corresponding to different categories of location entities for which a user may desire to search around his current geographic location. For example, the interface portion 195 in interface 190 includes information by which a user can search for nearby fast food restaurants, while interface portion 196 includes information by which a user can search for nearby movie theaters.

Figure 12:
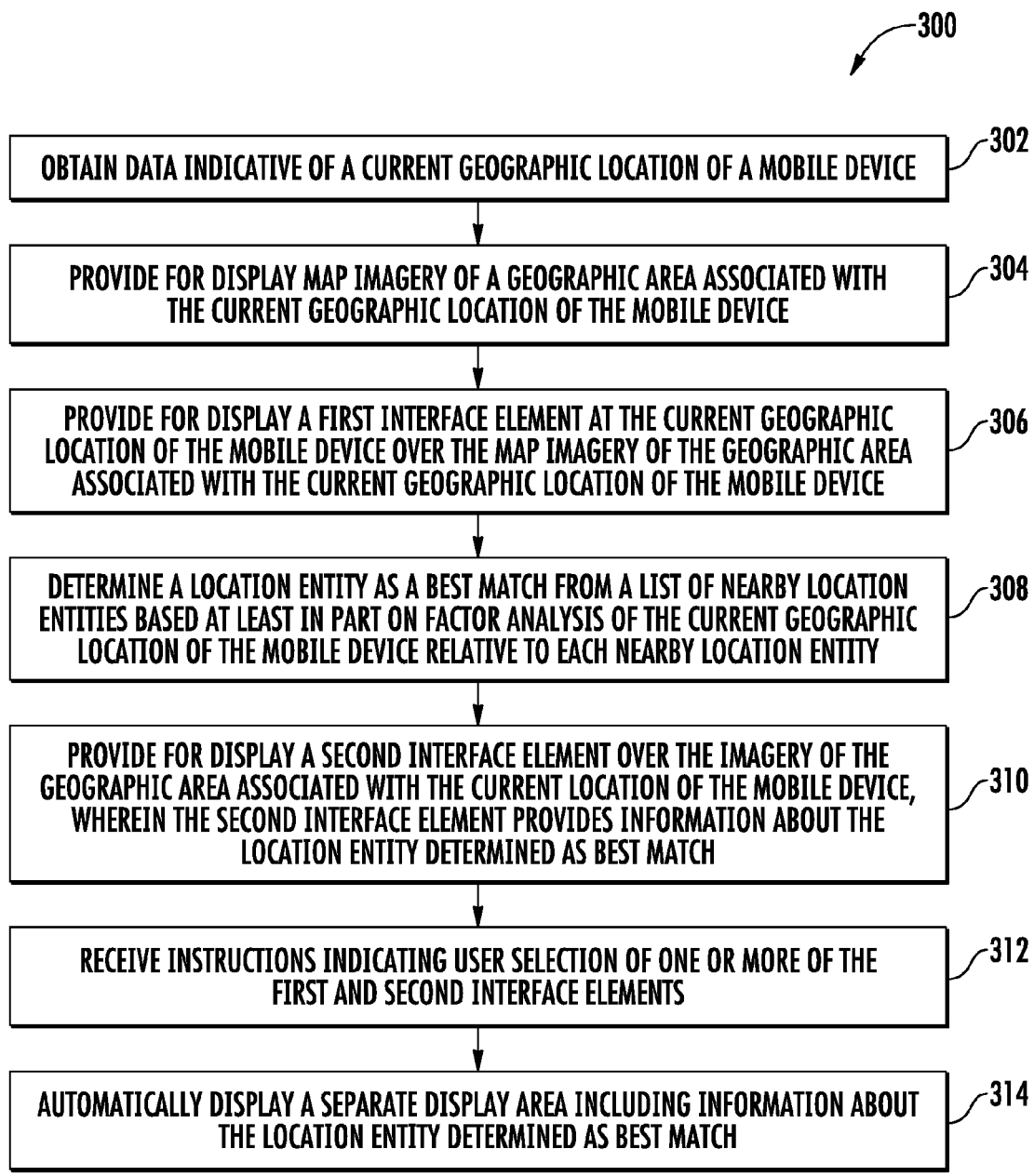
FIG. 12 depicts a flow diagram of an example method of generating and displaying location entity information associated with the current geographic location of a mobile device according to example aspects of the present disclosure.

FIGS. 12-15 depict various aspects of example methods for generating and displaying location entity information associated with the current geographic location of a mobile device. In FIG. 12, method (300) of generating and displaying location entity information includes obtaining data (302) indicative of a current geographic location of a mobile device. Data can be obtained in a mapping application configured for operation on a mobile device using location signals obtained at (302) from other accessible components, including but not limited to a GPS, wi-fi scans, and/or cellular triangulation signals. Map imagery of a geographic area associated with the current geographic location of the mobile device is provided for display at (304). Examples of map imagery displayed at (304) include map imagery 112 of FIG. 1, map imagery 122 of FIG. 2, map imagery 132 of FIG. 3 and map imagery 142 of FIG. 4. A first interface element (e.g., the circular graphical icon 113 of FIG. 1) is provided for display at (306). The first interface element provided for display at (306) can be provided over the map imagery at the estimated current geographic location of the mobile device as determined from data obtained at (302).

Referring still to FIG. 12, a location entity selected from a list of nearby location entities is determined at (308) as a best match for the current geographic location of the mobile device. Determination (308) can involve a predetermined algorithm including specific factor analysis of the current geographic location of the mobile device relative to each location entity in the list of nearby location entities. Factor analysis algorithms can analyze each location entity relative to the current geographic location in terms of one or more factors including but not limited to: location signal availability factors, distance factors, popularity factors, business hour overlap factors, and/or personalization factors as previously described. In other examples, determining a location entity as a best match at (308) involves providing a disambiguation display to a mobile device user, by which a user can manually select from a list of location entities, search for or manually enter a particular location entity as the best match for determination in (308).

Once a particular location entity is determined as a best match at (308), a second interface element is provided for display (310) over the map imagery of the geographic area provided at (304). The second interface element provided for display at (310) provides the mobile device user with additional information about the location entity determined as best match at (308). In one example, the second interface element provides additional information in the form of a text label positioned adjacent to the first interface element (e.g., text labels 137 and 145 in FIGS. 3 and 4, respectively.) In another example, the second interface element provides additional information in the form of a categorical icon (e.g., icon 127 in FIG. 2 or icon 173 in FIG. 7). In a still further example, the second interface element provides additional information in the form of a flyout text label next to a map legend, such as text label 126 next to guide icon 125 in FIG. 2.

The first and/or second interface elements provided for display at (306) and (310) can be configured as selectable interface elements that can be selected by a mobile device user (e.g., via touchscreen, stylus, keyboard, eye-controlled input or the like). User selection of these or other interface elements can result in predetermined action taken within the disclosed embodiments. For example, user selection of one of more of the first and second interface elements can result in a system receiving instructions at (312) indicating user selection of one or more of the first and second interface elements. Receipt of these instructions at (312) can automatically initiate the provision for display (314) of a separate display area including information about the location entity determined at (308) as the best match for the current geographic location of the mobile device. The separate display area provided for display at (314) can be a new user interface screen or a popup window provided for display over the current interface (e.g., current map imagery). Examples of a separate display area provided at (314) can include the interfaces shown in FIGS. 5 and 9-11.

Figure 13:
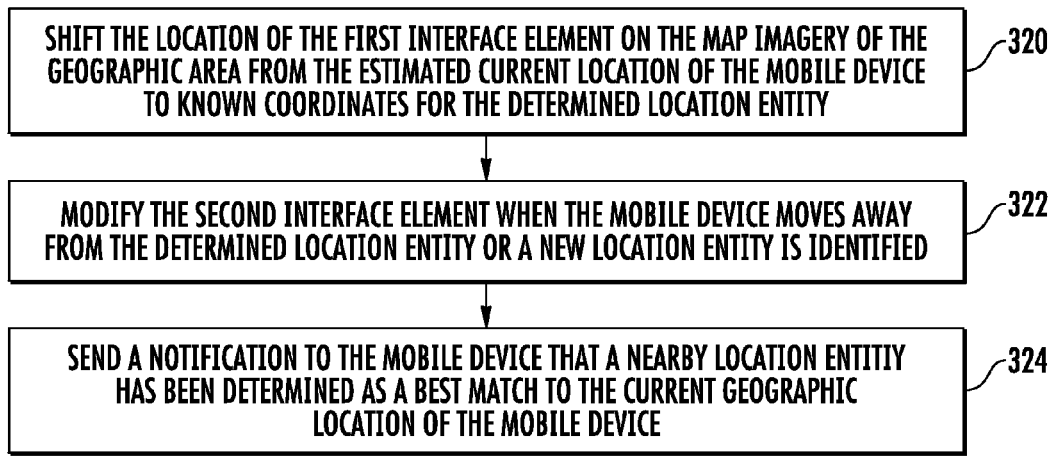
FIG. 13 depicts a flow diagram of additional aspects of an example method of generating and displaying location entity information associated with the current geographic location of a mobile device according to example aspects of the present disclosure.

FIG. 13 illustrates additional optional features that can be included in a method for generating and displaying location entity information associated with the current geographic location of a mobile device. In some examples, the location of the first interface element originally provided for display on the map imagery at (306) can be shifted at (320) to snap from the estimated current geographic location to known coordinates for the precise location of the location entity determined in (308) as a best match to the current geographic location of the mobile device. In other examples, the second interface element provided for display at (310) can be modified at (322) when the mobile device has moved away from a particular location entity or a new location entity is selected. Changes in location can be determined from changes in data obtained at (302) and corresponding location entity determinations at (308) and/or from manual user input regarding a location entity. Modification of the second interface element at (322) can include removing the interface element or altering the interface element. In still further examples, notifications can be sent at (324) indicating that a particular location entity has been determined as a best match to the mobile device's current geographic location. Notifications sent at (324) can be in the form of a popup notification within the mobile device operating system, an email, a text message or other form of electronically initiated communication.

Figure 14:
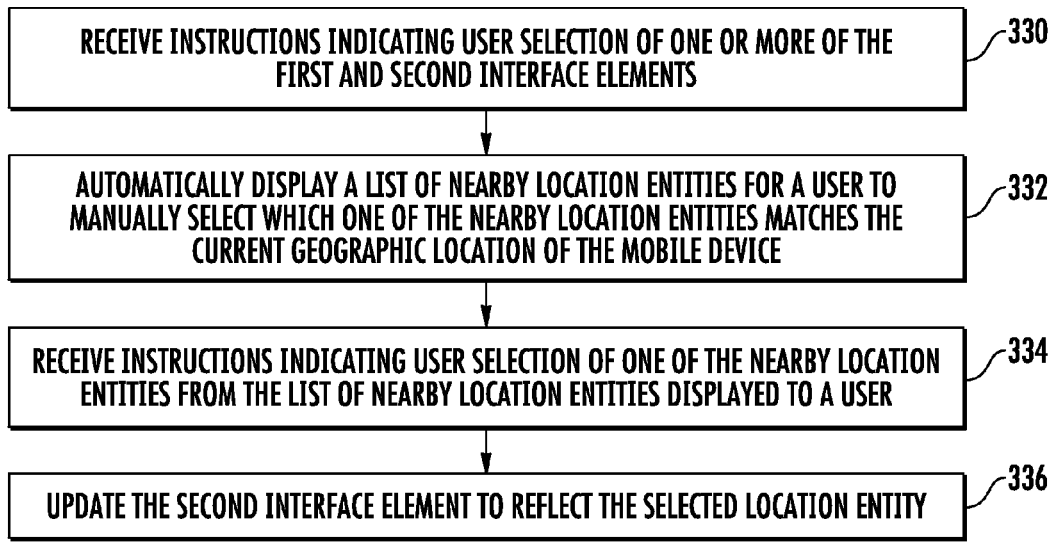
FIG. 14 depicts a flow diagram of additional aspects of an example method of generating and displaying location entity information associated with the current geographic location of a mobile device according to example aspects of the present disclosure.

FIG. 14 illustrates additional or alternative features that can be included in a method for generating and displaying location entity information associated with the current geographic location of a mobile device. One or more interface elements in the disclosed interfaces can be configured as selectable elements, such that a predetermined type of user selection (e.g., single-tap, double-tap, press-and-hold, etc.) of these interface elements results in provision of a disambiguation display. These interface elements can correspond to the first and second interface elements provided for display at (306) and (310), or can be other predetermined interface elements. In some examples, the first and/or second interface elements are configured to trigger display of a list as described in FIG. 14 only when a location entity cannot automatically be determined with a desired level of accuracy (e.g., a high confidence score).

Instructions can be received at (330) indicating user selection of one or more of the first and second interface elements. A list of nearby location entities then can be displayed (332) for a user to manually select which one of the nearby location entities matches the current geographic location of the mobile device. For example, if the user is currently in an outlet shopping mall that has several nearby stores/restaurants, the list of nearby location entities could include the top ten stores/restaurants in closest proximity to the user. Each location entity on the list can also be configured as a selectable interface element so that a user can select from the list. Instructions then can be received at (334) indicating user selection of one of the nearby location entities from the list as matching the current geographic location of the mobile device. After user selection at (334), the second interface element can be updated (336) to reflect the location entity selected at (334).

Figure 15:
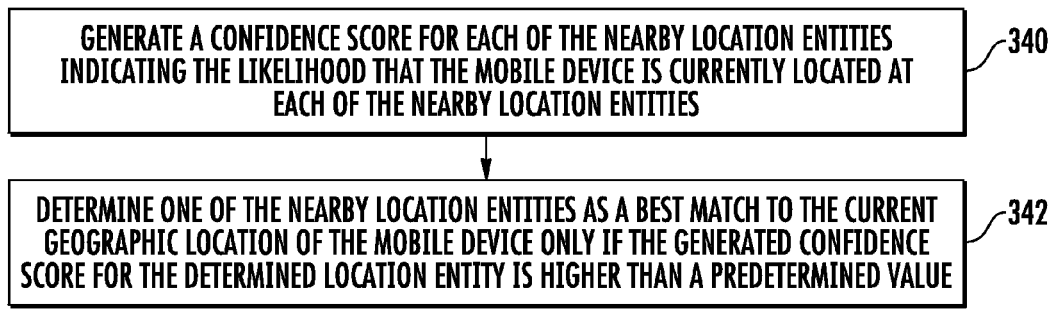
FIG. 15 depicts a flow diagram of additional aspects of an example method of generating and displaying location entity information associated with the current geographic location of a mobile device according to example aspects of the present disclosure.

FIG. 15 provides another flow chart of additional or alternative features that can be included in a method for generating and displaying location entity information associated with the current geographic location of a mobile device. The features illustrated in FIG. 15 generally concern the use of confidence scores in making a determination about the likely accuracy of location entity determinations in accordance with the disclosed embodiments. Confidence scores can be generated at (340) for each of the nearby location entities. Confidence scores can be generated at (340) using one or more factors, such as those previously described as being used in best match determination at (308), including but not limited to location signal availability factors, distance factors, popularity factors, business hour overlap factors, and/or personalization factors as previously described. In some examples, confidence scores can be generated for only a subset of nearby location entities (e.g., top ten or top five nearby location entities). In other examples, a confidence score can be generated for only a determined best match to see if the identified best match achieves a desired level of confidence score. In some examples, one of the nearby location entities can only be determined at (342) as a best match for the current geographic location of a mobile device if the generated confidence score for the determined location entity is higher than a predetermined value. Best match determination at (342) is similar to determination at (308), except that a threshold confidence score for a location entity to be considered a best match is required at (342). If a high confidence score is not generated, then additional location information or manual user disambiguation could be sought.

Figure 16:
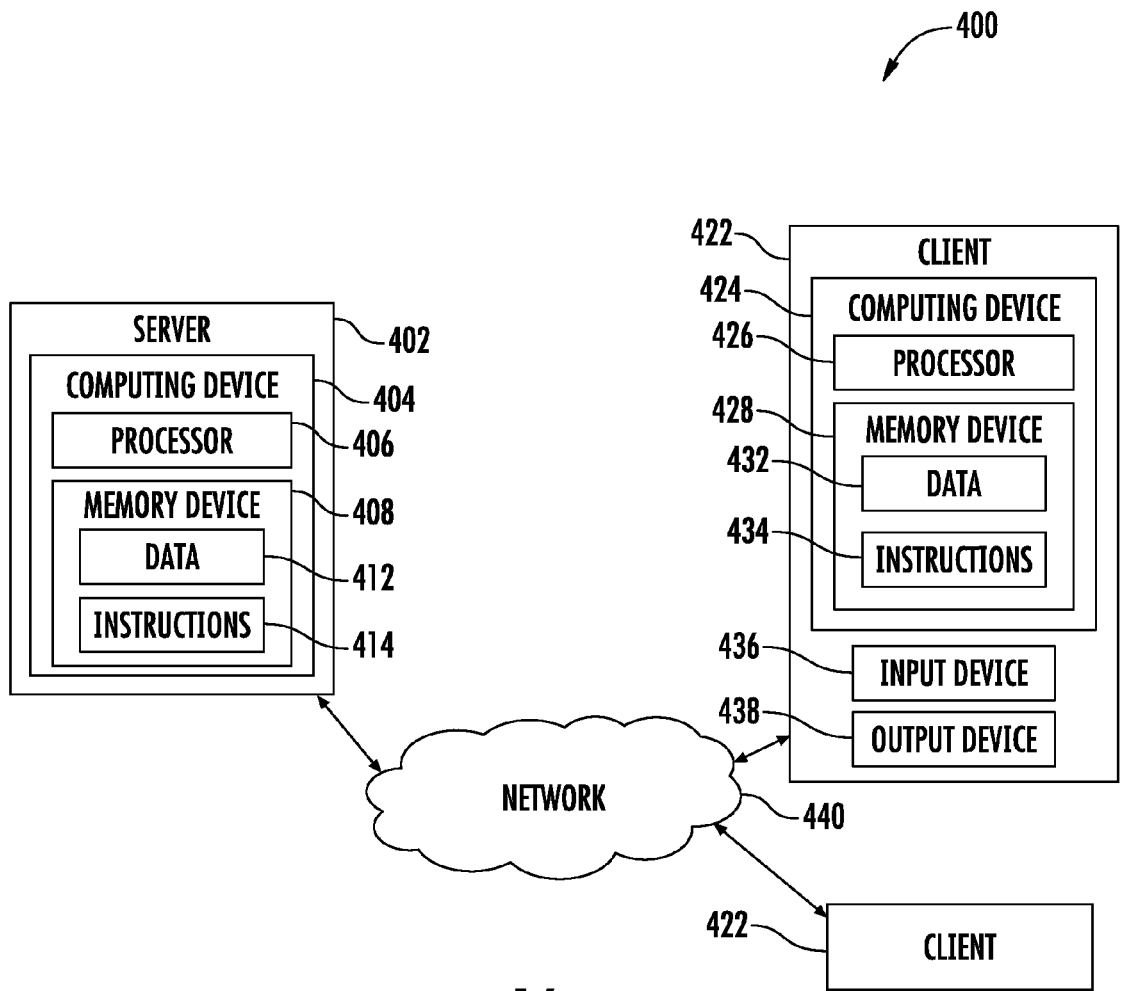
FIG. 16 provides an example overview of system components for implementing a mobile application according to example aspects of the present disclosure.

FIG. 16 depicts a computing system 400 that can be implemented using a client-server architecture that includes a server 402 and one or more clients 422. Server 402 can correspond, for example, to a web server hosting a geographic information system accessible by clients 422 in order to assist with determining or displaying location entity information in accordance with the disclosed techniques.

Each server 402 and client 422 can include at least one computing device, such as depicted by server computing device 404 and client computing device 424. Although only one server computing device 404 and one client computing device 424 is illustrated in FIG. 16, multiple computing devices optionally can be provided at one or more locations for operation in sequence or parallel configurations to implement the disclosed methods and systems of displaying location entity information. In other examples, the system 400 can be implemented using other suitable architectures, such as a single computing device. Each of the computing devices 404, 424 in system 400 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device. Computing device 424 can correspond to a mobile device including one or more processors configured to perform aspects of the disclosed technology.

The computing devices 404 and/or 424 can respectively include one or more processor(s) 406, 426 and one or more memory devices 408, 428. The one or more processor(s) 406, 426 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 408, 428 can include one or more computer-readable media, including, but not limited to, non-transitory computer-readable media, RAM, ROM, hard drives, flash drives, or other memory devices. In some examples, memory devices 408, 428 can correspond to coordinated databases that are split over multiple locations.

The one or more memory devices 408, 428 store information accessible by the one or more processors 406, 426, including instructions 414, 434 that can be executed by the one or more processors 406, 426. For instance, server memory device 408 can store databases for storing location entity identifier information, navigation and mapping databases and other comprehensive databases. The client memory device 428 can store instructions for implementing a browser or module that allows a user to request information from server 402, including navigation directions, navigation information, location information, and/or information related to past, current or future client locations. Client memory device 428 can also store instructions for implementing a passive application in accordance with the disclosed technology. The one or more memory devices 408, 428 can also include data 412, 432 that can be retrieved, manipulated, created, or stored by the one or more processors 406, 426.

Computing devices 404 and 424 can communicate with one another over a network 440. In such instances, the server 402 and one or more clients 422 can also respectively include a network interface used to communicate with one another over network 440. The network interface(s) can include any suitable components for interfacing with one more networks, including for example, transmitters, receivers, ports, controllers, antennas, or other suitable components. The network 440 can be any type of communications network, such as a local area network (e.g. intranet), wide area network (e.g. Internet), cellular network, or some combination thereof. The network 440 can also include a direct connection between server computing device 404 and client computing device 424. In general, communication between the server computing device 404 and client computing device 424 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The client 422 can include various input/output devices for providing and receiving information to/from a user. For instance, an input device 436 can include devices such as a touch screen, touch pad, data entry keys, eye controller and/or a microphone suitable for voice recognition. Input device 436 can be employed by a user to identify a destination location for determining navigation directions thereto in accordance with the disclosed embodiments. An output device 438 can include audio or visual outputs such as speakers or displays for providing graphical user interfaces including mapping information and current location to a user. Audio and/or visual alarms also could be provided at output device 438 to provide signals to a user indicating the arrival of a user at a particular location entity or geographic location.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the module.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of generating and displaying location entity information associated with the current geographic location of a mobile device, comprising:

obtaining data, by one or more computing devices, indicative of a current geographic location of the mobile device;

providing for display, by the one or more computing devices, a map of a geographic area associated with the current geographic location of the mobile device;

providing for display, by the one or more computing devices, a first interface element corresponding to a first icon at a location on the map corresponding to the current geographic location of the mobile device;

determining, by the one or more computing devices, a location entity as matching the current geographic location of the mobile device, wherein the matching location entity is determined from confidence scores generated for a list of nearby location entities, wherein the confidence scores are based at least in part on a factor analysis of the current geographic location of the mobile device relative to each location entity in the list of nearby location entities;

determining, by the one or more computing devices, a category for the matching location entity, wherein the category is determined from metadata associated with the matching location entity;

accessing, by the one or more computing devices, a dedicated graphical icon for the category of the matching location entity, wherein different categories of location entities have different dedicated types of icons providing informational context about the corresponding category;

automatically providing for display, by the one or more computing devices, a second interface element comprising a second icon when the matching location entity is determined with greater than a threshold confidence score, the second icon comprising the dedicated graphical icon corresponding to the category determined for the matching location entity, wherein the second interface element is superimposed on the first interface element on the map, and wherein the second interface element provides information about the matching location entity;

receiving, by the one or more computing devices, data indicative of user selection of one or more of the first and second interface elements; and automatically providing for display, by the one or more computing devices, a separate display area including information about the matching location entity.

2. The computer-implemented method of claim 1, wherein the separate display area including information about the matching location entity includes an icon indicating that the matching location entity has been determined as matching the current geographic location of the mobile device.

3. The computer-implemented method of claim 1, further comprising:

receiving, by the one or more computing devices, data indicative of user selection of one or more of the first and second interface elements; and automatically providing for display, by the one or more computing devices, in response to the receiving data, a list of nearby location entities for a user to manually select which one of the nearby location entities matches the current geographic location of the mobile device.

4. The computer-implemented method of claim 3, wherein the list of nearby location entities provided for display to a user is ranked in descending order from closest location to farthest location within a predetermined area surrounding the current geographic location of the mobile device.

5. The computer-implemented method of claim 3, wherein the list of nearby location entities provided for display to a user is ranked using a combination of location information indicating the distance from each nearby location entity to the current geographic location of the mobile device and personalization information indicating location entities of interest for a given user.

6. The computer-implemented method of claim 5, wherein the personalization information indicating location entities of interest for a given user comprises data associated with one or more of previously visited locations, previously searched locations, previously saved locations and user preferences.

7. The computer-implemented method of claim 3, further comprising:

receiving, by the One or more computing devices, data indicative of user selection of one of the nearby location entities from the list of nearby location entities displayed to a user; and updating, by the one or more computing devices, the second interface element to reflect the selected location entity.

8. The computer-implemented method of claim 1, wherein the second interface element further comprises a text label positioned adjacent to the first icon, wherein the text label provides a semantic identifier of the name of the matching location entity.

9. The computer-implemented method of claim 1, wherein the second interface element comprises a text label positioned adjacent to a guide icon, wherein the text label provides a user-assigned alias name associated with the matching location entity.

10. The computer-implemented method of claim 1, further comprising shifting, by the one or more computing devices, the location of the first interface element on the map from the estimated current location of the mobile device to known coordinates for the matching location entity.

11. The computer-implemented method of claim 1, further comprising modifying, by the one or more computing devices, the second interface element when the mobile device moves away from the matching location entity or determines a new location entity.

12. The computer-implemented method of claim 1, further comprising sending, by the one or more computing devices, a notification to the mobile device that one of the nearby location entities has been determined as matching the current geographic location of the mobile device.

13. The computer-implemented method of claim 1, wherein the determining a location entity as matching the current geographic location of the mobile device comprises:

generating a confidence score for each of the nearby location entities indicating the likelihood that the mobile device is currently located at each of the nearby location entities; and determining one of the nearby location entities as matching the current geographic location of the mobile device only if the generated confidence score for the selected location entity is higher than a predetermined value.

14. A computing device, comprising:

one or more processors; and one or more memory devices, the one or more memory devices storing computer-readable instructions that when executed by the one or more processors, cause the one or more processors to perform operations, the operations comprising:

obtaining data indicative of a current geographic location of the mobile device;

providing for display a map of a geographic area associated with the current geographic location of the mobile device;

providing for display a first interface element corresponding to a first icon at a location on the map corresponding to the current geographic location of the mobile device;

determining a location entity as matching the current geographic location of the mobile device, wherein the matching location entity is determined from confidence scores generated for a list of nearby location entities, wherein the confidence scores are based at least in part on a factor analysis of the current geographic location of the mobile device relative to each location entity in the list of nearby location entities;

determining a category for the matching location entity, wherein the category is determined from metadata associated with the matching location entity;

accessing a dedicated graphical icon for the category of the matching location entity, wherein different categories of location entities have different dedicated types of icons providing informational context about the corresponding category;

automatically providing for display a second interface element comprising a second icon when the matching location entity is determined with greater than a threshold confidence score, the second icon comprising the dedicated graphical icon corresponding to the category determined for the matching location entity, wherein the second interface element is superimposed on the first interface element on the map, and wherein the second interface element provides information about the matching location entity;

receiving instructions indicating user selection of one or more of the first and second interface elements; and automatically providing for display a separate display area including information about the matching location entity.

15. The computing device of claim 14, wherein determining a location entity as matching the current geographic location of the mobile device comprises:

generating a confidence score for each of the nearby location entities indicating the likelihood that the mobile device is currently located at each of the nearby location entities; and determining one of the nearby location entities as matching the current geographic location of the mobile device only if the generated confidence score for the matching location entity is higher than a predetermined value.

16. The computing device of claim 15, wherein when the generated confidence score for the nearby location entity is lower than a predetermined value and when data is received indicative of user selection of the first interface element, a list of nearby location entities is automatically provided for display for a user to manually select which one of the nearby location entities matches the current geographic location of the mobile device.

17. One or more tangible, non-transitory computer-readable media storing computer-readable instructions that when executed by one or more processors cause the one or more processors to perform operations, the operations comprising:

obtaining data indicative of a current geographic location of the mobile device;

providing for display a map of a geographic area associated with the current geographic location of the mobile device;

providing for display a first interface element corresponding to a first icon at a location on the map corresponding to the current geographic location of the mobile device;

determining a location entity as matching the current geographic location of the mobile device, wherein the matching location entity is determined from confidence scores generated for a list of nearby location entities, wherein the confidence scores are based at least in part on a factor analysis of the current geographic location of the mobile device relative to each location entity in the list of nearby location entities;

determining a category for the matching location entity, wherein the category is determined from metadata associated with the matching location entity;

accessing a dedicated graphical icon for the category of the matching location entity, wherein different categories of location entities have different dedicated types of icons providing informational context about the corresponding category;

automatically providing for display a second interface element comprising a second icon when the matching location entity is determined with greater than a threshold confidence score, the second icon comprising the dedicated graphical icon corresponding to the category determined for the matching location entity, wherein the second interface element is superimposed on the first interface element on the map, and wherein the second interface element provides information about the matching location entity;

receiving instructions indicating user selection of one or more of the first and second interface elements; and automatically providing for display a separate display area including information about the matching location entity.

18. The computer-readable media of claim 17, wherein determining a location entity as matching the current geographic location of the mobile device comprises:

generating a confidence score for each of the nearby location entities indicating the likelihood that the mobile device is currently located at each of the nearby location entities; and determining one of the nearby location entities as matching the current geographic location of the mobile device only if the generated confidence score for the matching location entity is higher than a predetermined value.

19. The computer-readable media of claim 18, wherein when the generated confidence score for the nearby location entity is lower than a predetermined value and when data is received indicative of user selection of the first interface element, a list of nearby location entities is automatically provided for display for a user to manually select which one of the nearby location entities matches the current geographic location of the mobile device.

* * * * *